United States Patent [19]

Parsons et al.

[11] 3,952,693
[45] Apr. 27, 1976

[54] MACHINE TOOL DIAL ASSEMBLY
[75] Inventors: Hubert J. Parsons, Belleair Beach, Fla.; Charles D. Sherwood, Elmira, N.Y.
[73] Assignee: Hardinge Brothers, Inc., Elmira, N.Y.
[22] Filed: Aug. 20, 1974
[21] Appl. No.: 498,976

[52] U.S. Cl. ................ 116/115.5; 116/DIG. 47
[51] Int. Cl.² ................................ B23Q 17/00
[58] Field of Search ............ 116/115.5, 115.5 EM, 116/124 A, 129 F, DIG. 47; 33/162, 166

[56] References Cited
UNITED STATES PATENTS

| | | | |
|---|---|---|---|
| 3,315,633 | 4/1967 | Rabinow | 116/115.5 EM |
| 3,536,030 | 10/1970 | Schroeder | 116/115.5 EM |
| 3,536,031 | 10/1970 | Sindall | 116/115.5 EM |
| 3,696,776 | 10/1972 | Waplington | 116/115.5 EM |

Primary Examiner—Richard E. Aegerter
Assistant Examiner—A. Jason Mirabito
Attorney, Agent, or Firm—Shlesinger, Arkwright, Garvey & Dinsmore

[57] ABSTRACT

A machine tool dial assembly to enable readings indicative of the linear displacement of a machine element to be taken simultaneously in Metric and English units of measurement. The English dial is driven directly by the feed screw shaft and rotates in unison therewith. The Metric dial is mounted adjacent to and coaxially with the English dial and driven by means of the feed screw shaft through a gearing arrangement having an appropriate conversion ratio and comprising externally toothed driving and driven gears and a pinion gear in intermeshing engagement therewith. The dials are frictionally adjustable independently of the gearing arrangement and feed screw shaft by virtue of spring-biased friction shoes in contact with the inner surfaces of the dials.

21 Claims, 10 Drawing Figures

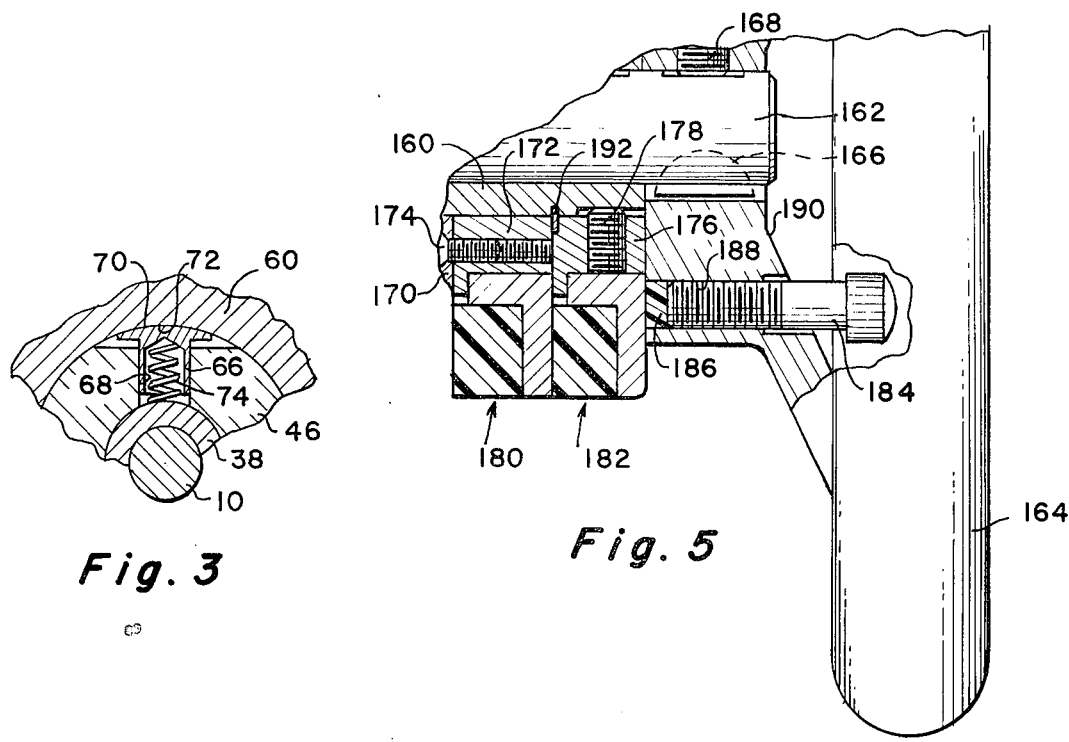
Fig. 3
Fig. 5
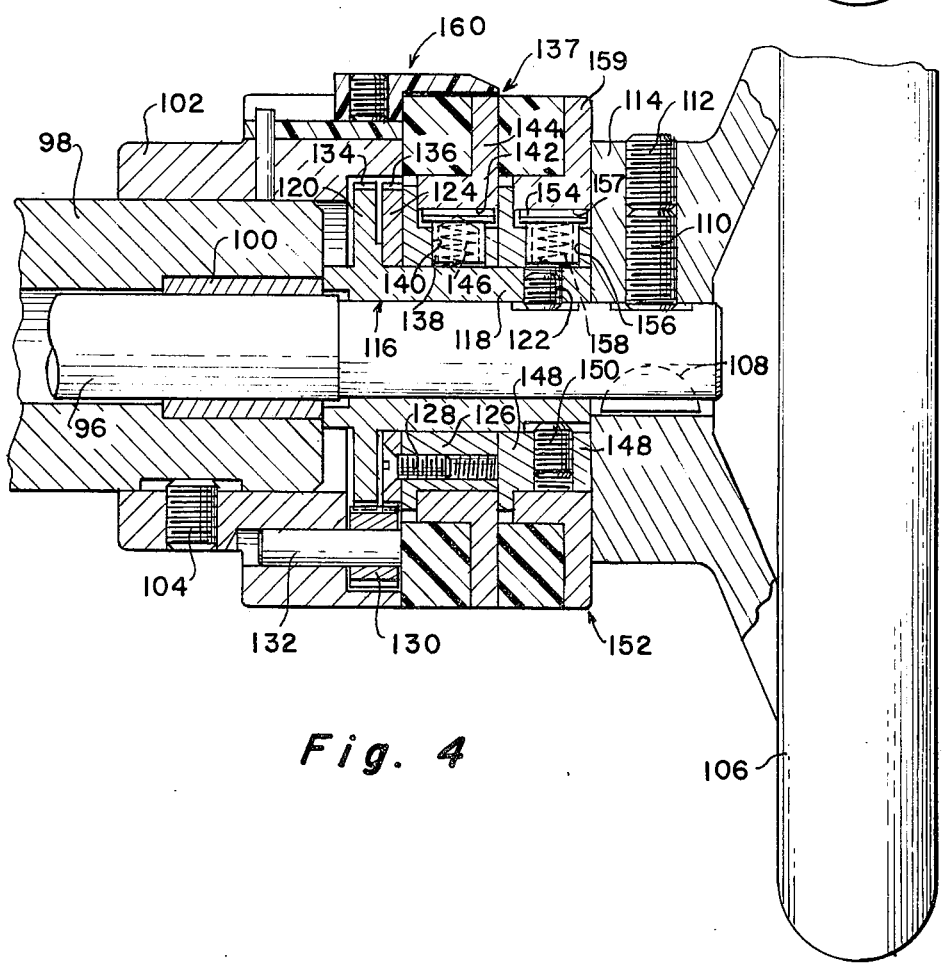
Fig. 4

MACHINE TOOL DIAL ASSEMBLY

BACKGROUND OF THE INVENTION

The invention relates to a dial assembly enabling readings to be taken simultaneously on English and Metric scales of measurement and is adapted particularly for use with a machine tool wherein linear movement of the carriage, cross slide, tool, etc. is effected by means of a feed screw.

Characteristically, machine tools have indicator dials which are calibrated in either English or Metric units, depending on the standard of measurement used in the particular country. Several English-speaking countries, however, are presently in the process of changing from an English system to a Metric system, and since the conversion is being effected gradually, the manufacturing industry is often required to produce both products which conform to Metric specifications as well as those which conform to English specifications. Possible ways to provide this capability are to maintain two sets of machinery calibrated in English and in Metric units or to require operators to perform the necessary conversion calculation. Economic and time considerations, however, render these solutions inadequate and point up the advantages of modifying existing machinery to render it capable of indicating linear displacement in both English and Metric units.

In one type of prior art device, the English and Metric scales are carried by a single dial and clutch means are provided for bringing the conversion gearing into play whereby the reading may be made alternatively in English or Metric units. In another apparatus, English and Metric readings may be made simultaneously by means of internally toothed ring gears and a pinion gear in intermeshing engagement therewith. A disadvantage to using internally toothed gears, however, lies in the fact that they are more difficult and expensive to manufacture than externally toothed gears.

OBJECTS OF THE INVENTION

It is, therefore, an object of this invention to provide a machine tool dial assembly wherein readings may be taken simultaneously in English and Metric units.

Another object of this invention is to provide a machine tool dial assembly having a gearing mechanism incorporating externally toothed gears which may be manufactured more easily and less expensively than internally toothed gears.

Another object of this invention is to provide a machine tool dial assembly which eliminates the need for manual calculation of conversion between English and Metric units.

A further object of this invention is to provide a machine tool dial assembly which is relatively simple in construction and which may be adapted easily to existing machinery without the necessity for elaborate modifications.

A still further object of this invention is to provide a machine tool dial assembly which is compact.

Yet another object of this invention is to provide a machine tool dial assembly wherein the dials are frictionally adjustable for rapid and accurate zeroing without the necessity for performing a locking or unlocking operation.

Yet another object of this invention is to provide a machine tool dial assembly wherein the dials may be independently zeroed.

These and other objects of the present will become apparent from a consideration of the following description taken in conjunction with the accompanying drawings.

SUMMARY OF THE INVENTION

The invention is a machine tool dial assembly comprising a rotatable shaft, a first indicator dial having graduations in a first scale thereon representative of linear displacement, connecting means between the shaft and the dial for rotating the dial in unison with the shaft, a second indicator dial having graduations in a second scale thereon representative of linear displacement, gearing means connected between the shaft and the second dial for rotating the second dial through more or less than one revolution when the first dial rotates through one revolution, the gearing means including first and second externally toothed gears and a third gear in intermeshing engagement with the first and second gears.

BRIEF DESCRIPTION OF THE DRAWINGS

FIG. 3 is a fragmentary sectional view of FIG. 2 taken along line 3—3 and viewed in the direction of the arrows;

FIGS. 4, 5 and 6 are partial sectional views of other embodiments of the invention;

DETAILED DESCRIPTION OF THE DRAWINGS

Figure 1:
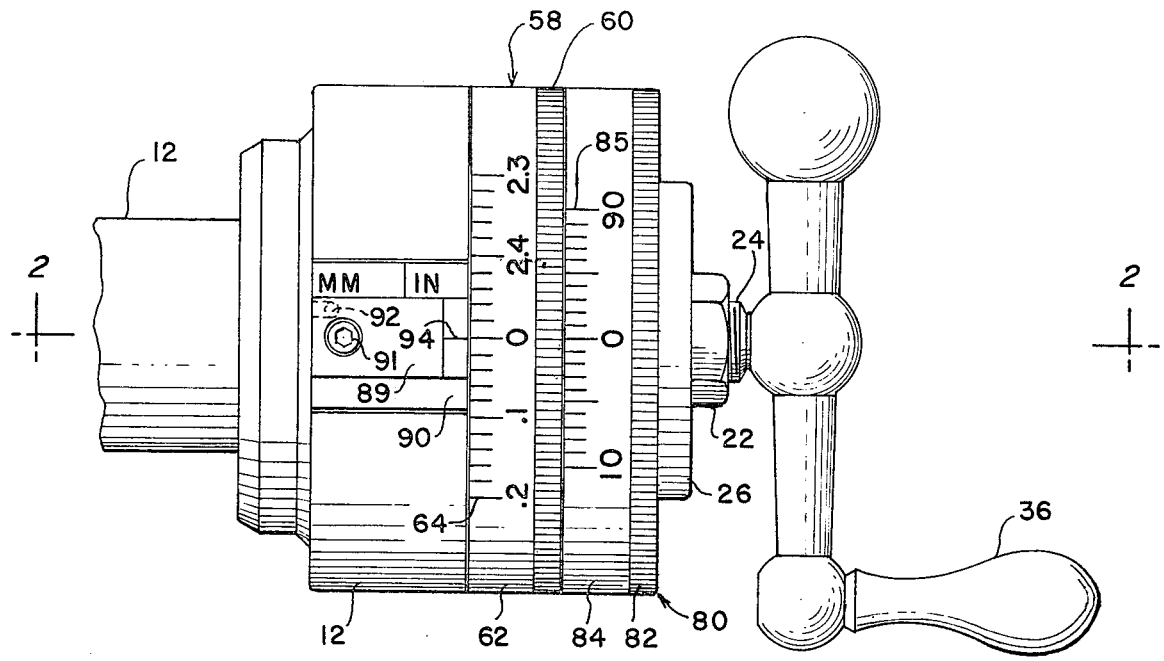
FIG. 1 is a plan view of a dial assembly according to this invention with the zero line indicator in the Metric dial position.

A shaft 10, which may be part of or connected to the feed screw (not shown), for instance, of a machine tool, is rotatably mounted within housing 12 by means of bearings 14. Inner ball bearing races 16 and 18 are tightened against the shoulder 20 of shaft 10 as nut 22 is tightened on threads 24 thereby urging bushing 26 and drive gear 28 in a forward direction. Outer ball bearing races 30 and 32 are retained against housing 12 by spanner nut 29. A hand crank 36 is attached to shaft 10 by any suitable means.

Drive gear 28 includes a rear sleeve portion 38, a forward sleeve portion 40 in abutment with ball bearing race 18 and an externally toothed radially extending portion 42 and rotates in unison with shaft 10. A driven gear 44 is rigidly secured to a forward bushing 46 by means of screw 48 and this assembly is somewhat loosely positioned on rear sleeve portion 38 such that the gears 28 and 44 may rotate independently of each other. A pinion gear 50, rotatably mounted on pin 52, is in intermeshing engagement with the teeth 54 and 56 of gears 28 and 44, respectively. To effect the proper conversion from the Metric to English or vice versa, the gear ratio between gears 44 and 28 is 125:127.

A dial 58 is positioned around forward bushing 46. It consists of a knurled sleeve 60 and a nylon ring 62 which is graduated in Metric units indicative of the amount of linear displacement effected by the rotation of shaft 10. For example, the pitch of the feed screw may be such that a complete rotation of shaft 10 may move a tool post (not shown) or the like a distance of 5 mm in which case nylon ring 62 would be circumferentially subdivided into increments wherein 360° of arc would represent 5 mm of linear displacement.

A dial brake shoe 66 is slidably positioned within a bore 68 in forward bushing 46 and its arcuate friction surface 70 urged into frictional engagement with the annular inner surface 72 of dial sleeve 60 by means of spring 74. The spring 74 is under compression sufficient to prevent the rotation of dial 58 on bushing 46 except when tangential torque is exerted on sleeve 60 as when an adjustment is made by the operator.

A rear bushing 76 is fixed to drive gear 28 by means of set screw 78 and accordingly rotates in unison with shaft 10. A second annular dial 80, which is positioned around rear bushing 76, consists of a sleeve 82 and a nylon ring 84. The rings 62 and 84 are rigidly fastened to their respective sleeves 60 and 82 by any suitable means such as gluing, bonding, etc. Unlike ring 62, however, ring 84 carries indicia 85 representative of linear displacement in fractions of inches. For example, if a complete rotation of shaft 10 causes linear displacement of 5 mm (approx. 0.2 inch), ring 84 would be circumferentially subdivided such that 360° of arc would represent a linear displacement of 0.2 inch. Depending on the degree of precision required, it may be desirable to subdivide ring 62 into 250 divisions with each division equal to a linear displacement of 0.01 mm, and ring 84 into 200 divisions, with each division equal to 0.0005 inch of displacement. A dial brake shoe 86 is slidably positioned in a bore 87 in rear bushing 76 and urged into frictional engagement with sleeve 82 by means of spring 88 in an identical manner as shoe 66.

Figure 2:
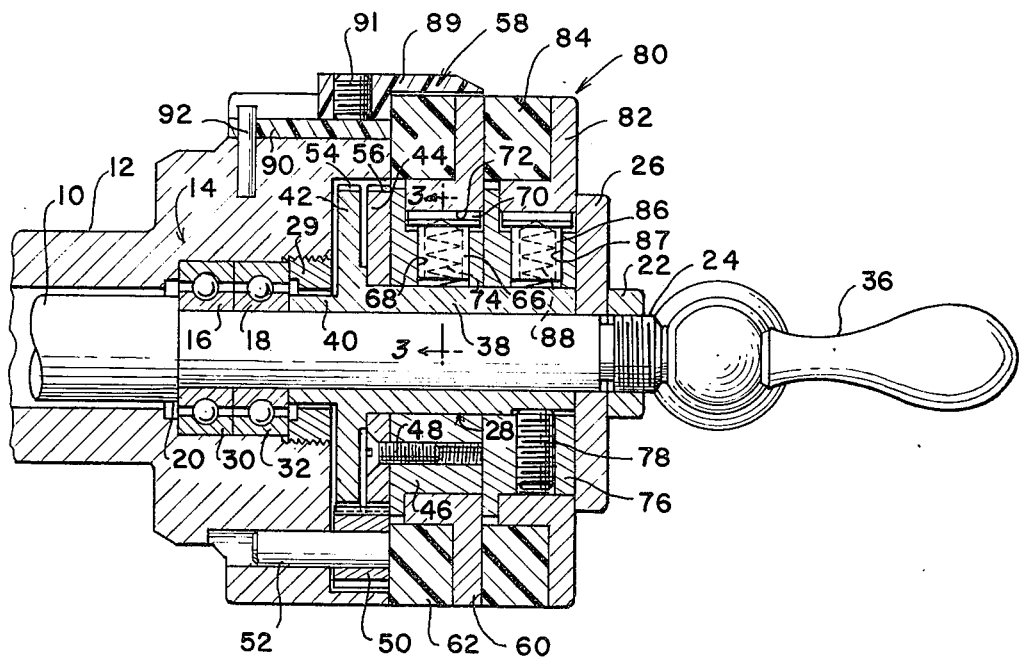
FIG. 2 is a sectional view of FIG. 1 taken along line 2—2 and viewed in the direction of the arrows with the zero line indicator in the English dial position.
Figure 6:
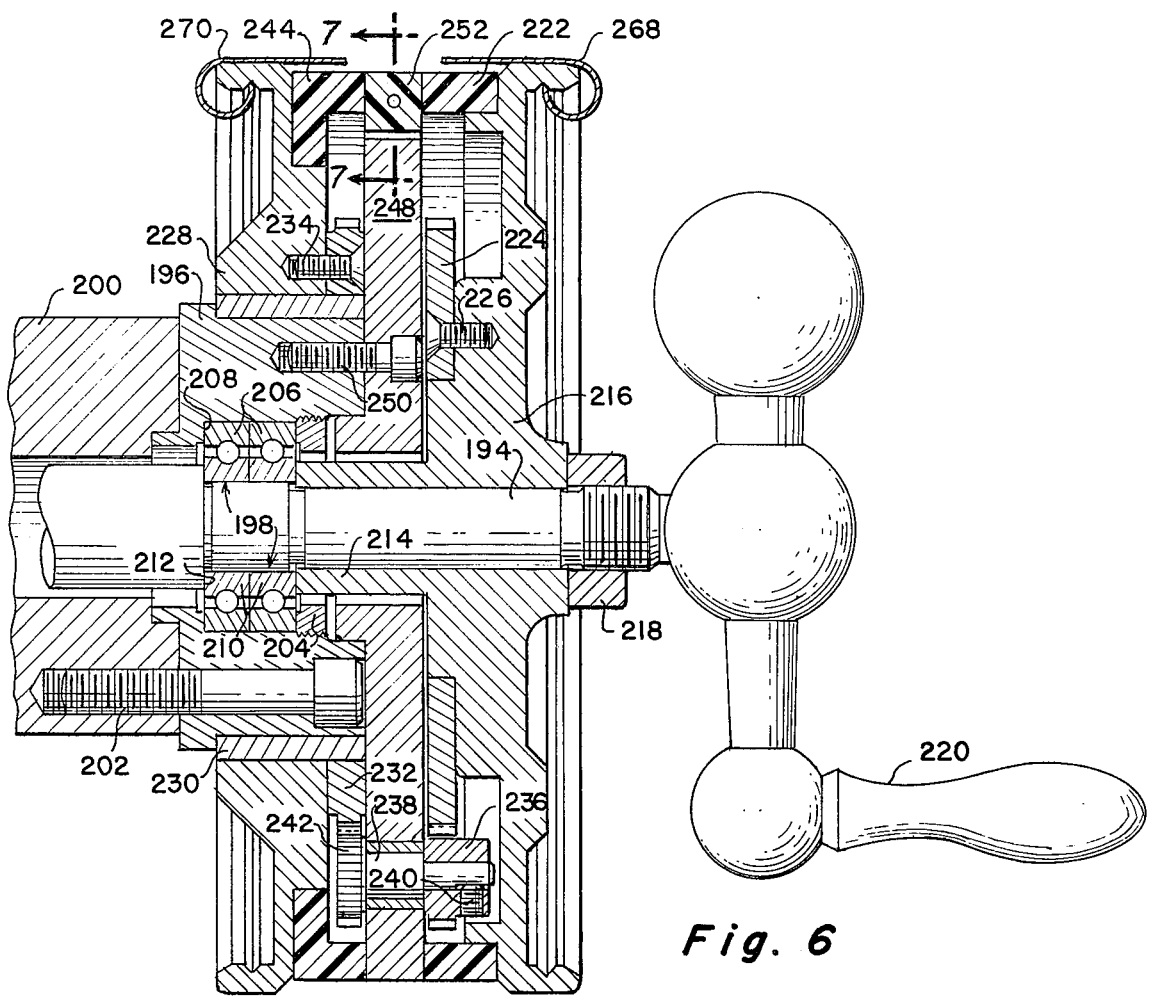

A zero line indicator 89 is slidably mounted in base 90 such that it can occupy the position shown in FIG. 1 for readings in Metric units or the position illustrated in FIG. 2 for readings in English units. A set screw 91 serves to lock indicator 89 in a given position and pin 92 extends through base 90 to limit the rearward movement of indicator 89. The indicator 89, which is preferably transparent, includes a zero line 94 to indicate on dials 58 and 80 the linear displacement effected as shaft 10 rotates.

The apparatus operates in the following manner.

As shaft 10 is rotated by hand crank 36, drive gear 28 and rear bushing 76 rotate in unison therewith. By the action of spring 88 urging brake shoe 86 against the inner surface of sleeve 82, dial 80 also rotates in unison with shaft 10. Should it be desired to move the tool post or cross slide 0.010 inch, for example, dial 80 is rotated by the operator until zero line 94 is lined up with 0. Hand crank 36 is then rotated until 10 on ring 84 is aligned with zero line 94.

As drive gear 42 is rotated in unison with shaft 10, its teeth 54 engage pinion gear 50 which in turn engages the teeth 56 of driven gear 44. Forward bushing 46 rotates in unison with driven gear 44 and carries dial 58 with it through the frictional engagement of brake shoe 66 with inner surface 72. Since the ratio of gear 44 to gear 28 is 125:127, as gear 28 rotates through 360° of arc, dial 58 rotates through (127/125) × 360° of arc. For example, should it be desired to advance the tool 2 mm, zero line indicator 89 is moved to the position shown in FIG. 1, dial 58 rotated until 0 on ring 62 is aligned with zero line 94 and hand crank 36 rotated until zero line 94 is then aligned with 2.0 on ring 62. The dials may also be graduated in units which directly indicate the change in the the diameter of the turned workpiece as the tool is advanced.

Since the rotation of dials 58 and 80 occurs simultaneously, movement of zero line indicator 89 to either the position shown in FIG. 1 or that shown in FIG. 2 will provide an indication of displacement in millimeters and inches, respectively.

Another embodiment of the invention is illustrated in FIG. 4. A shaft 96 connected to or integral with the carriage feed screw (not shown), for instance, is rotatably mounted with shaft housing 98 on bearing 100. A sleeve 102 is rigidly secured to housing 98 by means of set screw 104. A wheel 106 is locked to shaft 96 by key 108 and set screw 110; locking screw 112 serves to prevent the loosening of set screw 110. Positioned between housing 98 and the hub 114 of wheel 106 is a drive gear 116 which includes a sleeve portion 118 and a radially extending toothed portion 120. Drive gear 116 is rigidly secured to shaft 96 by means of set screw 122 and rotates in unison therewith. Positioned adjacent the toothed portion 120 of drive gear 116, is driven gear 124 which is rigidly secured to forward bushing 126 by means of screw 128. A pinion gear 130 rotatable on pin 132 is in intermeshing engagement with the teeth 134 and 136 of gears 116 and 124, respectively. As was the case in the previous embodiment, the ratio of gears 124 to 116 is 125:127. A dial 137 graduated in Metric increments and similar to dial 58 of the previous embodiment is frictionally retained around forward bushing 126 by means of brake shoe 138 slidably mounted in a bore 140 in forward bushing 126 and urged against the annular inner surface 142 of dial sleeve 144 by the action of compressed spring 146. By this arrangement, then, as bushing 126 rotates, dial 136 rotates in unison therewith but yet is frictionally adjustable with respect thereto.

A second dial 152 graduated in English units is frictionally retained around rear dial bushing 148 by means of brake shoe 154 slidably mounted in to bore 156 in bushing 148 and urged against the annular inner surface 157 of dial sleeve 159 by the action of compressed spring 158.

Zero line indicator 160, which is similar to indicator 89, is mounted to sleeve 102 in the manner previously described.

FIG. 5 illustrates a modified form of the dial assembly of FIG. 4. Similarly to the dial assembly of FIG. 4, the sleeve portion 160 of the drive gear is rigidly secured to shaft 162 by means of a set screw (not shown) and a hand wheel 164 locked to shaft 162 by key 166 and set screw 168. Driven gear 170 is rigidly secured to forward bushing 172 by means of screw 174. Dials 180 and 182 are frictionally retained around bushings 172 and 176, respectively, by means of brake shoes (not shown) similar to shoes 138 and 154 (FIG. 4).

Dial 182 may be frictionally locked to bushing 176 by means of locking screw 184. A nylon plug 186 is positioned within a bore 188 of hub 190 and urged against dial 182 as screw 184 is tightened. A snap ring 192 prevents rear bushing 176 from bindng with forward bushing 172 as set screw 184 is tightened.

Referring now to FIGS. 6 through 10, another form of the machine tool dial assembly is illustrated.

A shaft 194, which may be part of or connected to the feed screw (not shown) of a machine tool, is rotatably mounted within housing 196 by means of bearings 198 and extends into a sleeve 200 to which housing 196 is bolted as by bolt 202. A spanner nut 204 holds outer ball bearing races 206 against shoulder 208, and inner ball bearing races 210 are retained between shoulder 212 and the sleeve portion 214 of rear dial support 216 as nut 218 is tightened. A hand crank 220 is attached to shaft 194 by any suitable means.

A nylon ring 222 carrying indicia 223 in English units indicative of the amount of linear displacement effected by the rotation of the shaft 194, is glued, bonded or otherwise secured to rear dial support 216. Support 216 rotates in unison with shaft 194 and carries externally toothed driving gear 224 which is secured thereto by means of screws such as 226. A forward dial support 228 rotates with respect to housing 196 on bearing 230 and carries externally toothed driven gear 232 which is secured thereto by screws as 234. A pinion 236, which is locked to lay shaft 238 by set screw 240, engages the teeth of drive gear 224. A second pinion 242, also rigidly secured to shaft 238, is in engagement with driven gear 232. A nylon ring 244 carrying indicia 246 representative of the amount of linear displacement effected by the rotation of shaft 194 is glued, bonded or otherwise secured to forward support 228.

A center support member 248 is bolted to housing 196 as at 250 and rotatably supports lay shaft 238 and zero line indicator 252. Indicator 252 is in the shape of an axially truncated cylinder having opposite flat surfaces 254 and 256 carrying zero lines 258 and 260, respectively. Indicator 252 is positioned within a generally cylindrical socket 262 thereby permitting it to be rotated by means of lever 264 between the position shown in FIGS. 7 and 8 and the position shown in FIGS. 9 and 10. Center support 248 is provided with a groove 266 in which lever 266 lies, the end thereof extending from groove 266 sufficiently to permit the operator to reverse the position of indicator 252. Any number of adjustably positioned resilient reference clips 268 and 270 may be clipped to front and rear dial supports 228 and 216. These clips may be employed to assist the operator in advancing the tool to the proper positions required by a particular machining operation.

The dial assembly operates in the following manner. As shaft 194, rear dial support 216, dial 222 and gear 224 rotate in unison, the teeth of the latter engage pinion 236 thereby causing pinion 236, shaft 238, pinion 242 and driven gear 232 to rotate. Similarly to the previous embodiments, the ratio of gear 232 to gear 224 is 125:127. The pinions 236 and 242 each have an equal number of teeth. This gearing arrangement causes dials 222 and 244 to rotate relative to each other in a manner indicating the proper conversion from Metric to English displacement as described in conjuction with the embodiment of FIGS. 1, 2 and 3.

Figure 8:
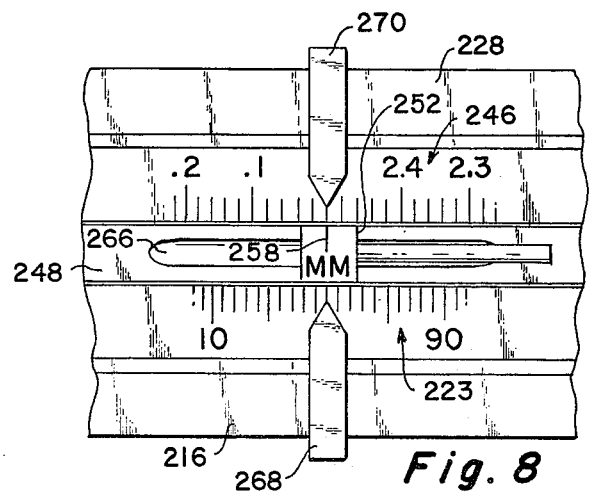
FIG. 8 is a fragmentary top plan view of FIG. 6 showing the zero line indicator in the metric dial position.
Figure 10:
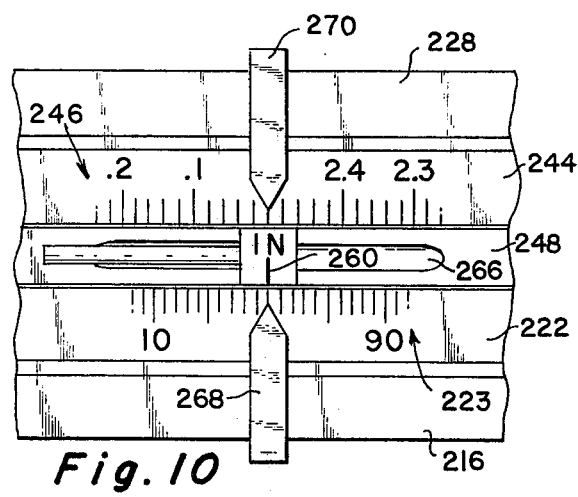
FIG. 10 is a fragmentary top plan view similar to FIG. 8 showing the zero line indicator in the English scale position.
Figure 7:
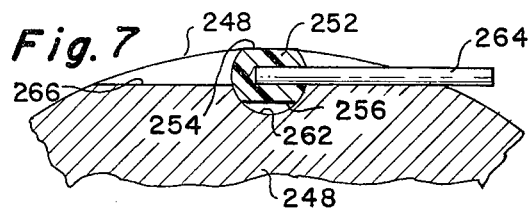
FIG. 7 is a fragmentary sectional view of FIG. 6 taken along line 7—7 and viewed in the direction of the arrows.
Figure 9:
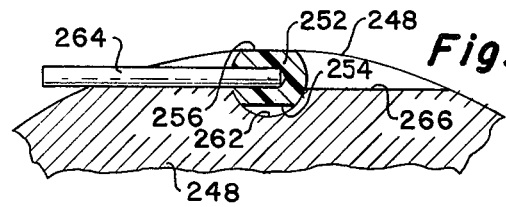
FIG. 9 is a fragmentary sectional view similar to FIG. 7 showing the zero line indicator in the English scale position.

Zero line indicator 252 may be rotated to either the Metric position as illustrated in FIGS. 7 and 8 or the English position as illustrated in FIGS. 9 and 10, depending on the desired scale. In the first position, zero line 258 is aligned with the Metric graduations on dial 244 and in the second position indicator 252 is inverted so that zero line 260 is in alignment with the English graduations on dial 222. Appropriate indicia such as MM and IN may be placed on indicator 252.

While this invention has been described as having a preferred design, it will be understood that it is capable of further modification. This application is, therefore, intended to cover any variations, uses or adaptations of the invention following the general principles thereof and including such departures from the present disclosure as come within known or customary practice in the art to which this invention pertains, and as may be applied to the essential features hereinbefore set forth and fall within the scope of this invention or the limits of the appended claims.

What is claimed is:

1. A machine tool dial assembly comprising:
   a. a rotatable shaft,
   b. a first frictionally adjustable indicator dial having indicia in a first scale thereon representative of linear displacement, said dial being positioned around a said shaft,
   c. connecting means between said shaft and said dial for rotating said dial in unison with said shaft,
   d. said connecting means including a first spring biased friction shoe urged into frictional contact with said dial,
   e. a second frictionally adjustable indicator dial having indicia in a second scale thereon representative of linear displacement, said second dial being positioned around said shaft,
   f. gearing means connected between said shaft and said second dial for rotating said second dial through more or less than one revolution as said first dial rotates through one revolution,
   g. said gearing means including a second spring biased friction shoe urged into frictional contact with said second dial,
   h. said gearing means including first and second externally toothed gears and third gear means in intermeshing engagement with said first and second gears.

2. The apparatus of claim 1 and wherein:
   a. said connecting means includes a bushing rigidly connected to said first gear,
   b. said first friction shoe is mounted within said bushing for radial rectilinear movement.

3. The apparatus of claim 2 and wherein:
   a. said gearing means includes a bushing rigidly connected to said second gear,
   b. said second friction shoe is mounted within said last mentioned bushing.

4. The apparatus of claim 1 and wherein:
   a. said first gear is connected to said first dial for rotation in unison therewith,
   b. said second gear is connected to said second dial for rotation in unison therewith.

5. The apparatus of claim 4 and including a housing in which said shaft is rotatably mounted.

6. The apparatus of claim 5 and wherein said third gear is rotatably mounted to said housing.

7. The apparatus of claim 4 and wherein:
   a. said first and second gears are mounted concentrically with said shaft,
   b. said third gear is rotatably mounted to said housing for tangential engagement with said first and second gears.

8. The apparatus of claim 1 and wherein the gear ratio between said first and second gears is 127:125.

9. A machine tool dial assembly comprising:
   a. a rotatable shaft, b. an annular first indicator dial positioned around said shaft,
c. first connecting means between said shaft and said dial for rotating said dial in unison with said shaft,
d. an annular second indicating dial positioned around said shaft,
e. said second dial having an inner surface,
f. conversion means connected between said shaft and said second dial for rotating said second dial through more or less than one revolution when said first dial is rotated through one revolution,
g. said conversion means including a bushing positioned around said shaft, a first externally toothed gear rigidly connected to said bushing, a second externally toothed gear rigidly connected to said shaft and pinion gear means in intermeshing engagement with said first and second gears,
h. said conversion means further including frictional connecting means comprising:
a friction shoe mounted on said bushing for movement in a direction substantially normal to said second dial inner surface and
resilient means associated with said friction shoe for yieldably urging said friction shoe into contact with said second dial inner surface,
said resilient means being compressible along a direction substantially normal to said dial inner surface.

10. The apparatus of claim 9 and wherein said resilient means comprises compression spring means.

11. The apparatus of claim 9 and wherein said resilient means is compressed in a direction substantially normal to said second dial inner surface.

12. The apparatus of claim 9 and wherein said friction shoe is mounted for rectilinear movement in a direction substantially normal to said second dial inner surface.

13. The apparatus of claim 9 and wherein said friction shoe is movable radially.

14. The apparatus of claim 9 and wherein:
a. said first indicator dial includes an annular inner surface,
b. said first connecting means includes a second bushing positioned around said shaft and rigidly connected thereto,
c. said first connecting means further includes second frictional connecting means comprising:
a friction shoe mounted on said second bushing for movement in a direction substantially normal to said first dial inner surface,
resilient means associated with said friction shoe for yieldably urging said friction shoe into contact with said first dial inner surface,
said last mentioned resilient means being compressible along a direction substantially normal to said first dial inner surface.

15. The apparatus of claim 9 and wherein said first connecting means includes:
a. a second bushing positioned around said shaft, and
b. set screw means for frictionally locking said first dial to said second bushing.

16. A machine tool dial assembly comprising:
a. a rotatable shaft,
b. a first indicator dial having indicia in a first scale thereon representative of linear displacement,
c. connecting means between said shaft and said dial for rotating said dial in unison with said shaft,
d. a second indicator dial having indicia in a second scale thereon representative of linear displacement,
e. said second dial being rotatable coaxially with said first dial,
f. gearing means connected between said shaft and said second dial for rotating said second dial through more or less than one revolution when said first dial rotates through one revolution,
g. a cursor line indicator support mounted about said shaft and having an annular outer surface positioned between said first and second dials, and
h. a cursor line indicator pivotally mounted in said annular outer surface for rotation about an axis parallel to the axis of said shaft and including at least two cursor lines,
i. one of said cursor lines being visually associated with said indicia on said first dial and the other of said cursor lines being visually disassociated with said indicia on said second dial when said indicator is rotated to a first position,
j. the other of said cursor lines being visually associated with said indicia on said second dial and said one of said cursor lines being visually disassociated with said position.

17. The dial assembly of claim 16 and wherein said indicator is a truncated cylinder having two planar surfaces parallel to each other.

18. The dial assembly of claim 17 and including a lever extending substantially radially from said indicator and adapted to rotate said indicator between said first and second positions.

19. The dial assembly of claim 17 and wherein said indicator is mounted for pivotal movement within a socket.

20. The dial assembly of claim 17 and wherein one of said cursor lines is on one of said planar surfaces and the other of said cursor lines is on the other of said planar surfaces.

21. The dial assembly of claim 16 and including indexing clips resiliently clamped thereto adjacent said dials.

* * * * *